US011292287B2

(12) United States Patent
Schulz et al.

(10) Patent No.: US 11,292,287 B2
(45) Date of Patent: Apr. 5, 2022

(54) DECAL FOR PRODUCING A DECORATION

(71) Applicant: Ferro GmbH, Frankfurt am Main (DE)

(72) Inventors: Andreas Schulz, Karben (DE); Marya Khan, Langen (DE); Lutz Poth, Roßdorf (DE); Silke Schäfer, Frankfurt (DE); Francesca Torsiello, Nidderau (DE); Florian Wentz, Darmstadt (DE)

(73) Assignee: Ferro GmbH, Frankfurt am Main (DE)

( * ) Notice: Subject to any disclaimer, the term of this patent is extended or adjusted under 35 U.S.C. 154(b) by 270 days.

(21) Appl. No.: 15/767,466

(22) PCT Filed: Oct. 14, 2016

(86) PCT No.: PCT/EP2016/074673
§ 371 (c)(1),
(2) Date: Apr. 11, 2018

(87) PCT Pub. No.: WO2017/064237
PCT Pub. Date: Apr. 20, 2017

(65) Prior Publication Data
US 2018/0297393 A1    Oct. 18, 2018

(30) Foreign Application Priority Data
Oct. 16, 2015   (DE) ................ 10 2015 117 711.0

(51) Int. Cl.
*B44C 1/175* (2006.01)
*B41M 7/00* (2006.01)
*C09C 1/62* (2006.01)
*B44C 1/165* (2006.01)
*C09J 7/22* (2018.01)
*B44C 1/10* (2006.01)
*B44C 1/14* (2006.01)

(52) U.S. Cl.
CPC ......... *B44C 1/1758* (2013.01); *B41M 7/0027* (2013.01); *B44C 1/165* (2013.01); *C09C 1/62* (2013.01); *B44C 1/105* (2013.01); *B44C 1/14* (2013.01); *C09J 7/22* (2018.01)

(58) Field of Classification Search
CPC ..... B44C 1/1758; B44C 1/105; B41M 7/0027
See application file for complete search history.

(56) References Cited

U.S. PATENT DOCUMENTS

| | | | |
|---|---|---|---|
| 3,949,139 A | 4/1976 | Dunning et al. | |
| 4,248,762 A | 2/1981 | Hornibrook et al. | |
| 4,275,116 A | 6/1981 | Krätschmer | |
| 4,418,099 A | 11/1983 | Cuevas et al. | |
| 5,401,535 A | 3/1995 | Bishop | |
| 5,545,452 A | 8/1996 | Schulz et al. | |
| 5,705,664 A | 1/1998 | Schulz et al. | |
| 5,721,303 A | 2/1998 | Schulz et al. | |
| 6,071,332 A | 6/2000 | Schulz et al. | |
| 6,303,679 B2 | 10/2001 | Schulz et al. | |
| 6,355,714 B1 | 3/2002 | Schulz et al. | |
| 6,773,498 B1 | 8/2004 | Groh et al. | |
| 7,674,502 B2 | 3/2010 | Knuth et al. | |
| 7,968,175 B2 | 6/2011 | Ragnetti et al. | |
| 8,309,171 B1 | 11/2012 | Lukas et al. | |
| 2002/0029713 A1* | 3/2002 | Morizumi | B41M 3/005 101/483 |
| 2003/0152735 A1* | 8/2003 | Koike | B32B 27/32 428/40.1 |
| 2003/0179274 A1* | 9/2003 | Morizumi | B41M 5/38214 347/172 |
| 2003/0194554 A1* | 10/2003 | Petersen | B05D 5/068 428/402 |
| 2004/0141041 A1* | 7/2004 | Tsutsumi | B41J 2/2056 347/102 |
| 2005/0028895 A1 | 2/2005 | Walter et al. | |
| 2005/0244584 A1* | 11/2005 | Afshar | C09D 5/004 427/407.1 |
| 2006/0194920 A1 | 8/2006 | Capote et al. | |
| 2010/0064938 A1* | 3/2010 | Voit | C09D 5/38 106/287.1 |
| 2010/0069241 A1* | 3/2010 | Kitano | B41M 5/3375 503/218 |
| 2011/0226161 A1* | 9/2011 | Schumacher | C09C 1/0024 106/417 |
| 2012/0223993 A1* | 9/2012 | Kagata | G06K 15/1871 347/14 |
| 2014/0342174 A1* | 11/2014 | Tominaga | G02B 5/0808 428/551 |

FOREIGN PATENT DOCUMENTS

WO    WO-2013121979 A1 *  8/2013  ............ F24S 23/82

OTHER PUBLICATIONS

Eckart, Altana 2019.*
International Search Report for corresponding PCT/EP2016/074673 dated Feb. 22, 2017, two pages.

* cited by examiner

*Primary Examiner* — Tong Guo
(74) *Attorney, Agent, or Firm* — Rankin, Hill & Clark LLP; Christopher Jan Korff

(57) ABSTRACT

The present invention relates to a decal for producing a decoration, comprising a non-leafing pigment layer and a first protective layer, characterized in that the decal is designed so that the non-leafing pigment layer can be applied closer to a substrate that the first protective layer. Furthermore, the present invention describes a method for producing the decal as well as its use.

17 Claims, No Drawings

DECAL FOR PRODUCING A DECORATION

The present invention relates to a decal for producing a decoration as well as a method for producing a decal.

Many articles such as glasses, dishware, or molded plastic pieces are provided with a decoration. In particular for the production of high-value porcelain and glass, so-called precious metal gloss preparations are often used, which can be pressed directly onto the articles to achieve a valuable decoration. These precious metal gloss preparations contain large amounts of precious metals, such as gold, so that their use involves high costs. Moreover, the obtained decorations are baked into the substrate at a high temperature (usually above 490° C.), so that high costs result and therefore they are only suitable for substrates which are resistant to these high temperatures. Such precious metal gloss preparations are described for example in DE 10 2004 031692 A1.

Moreover, the use of pigments to achieve glossy effects is known, generally making use of leafing pigments to obtain a specular surface. However, this embodiment has the drawback that the adherence of the pigments to the substrate is relatively slight and the pigment layer lies on the outside, so that it can easily become damaged. Non-leafing pigments are generally employed as a single-coat lacquer or primer, for example in order to achieve a corrosion protection (see Benda-Lutz: Lacquers and Coatings). However, the drawback is that the specular effect is so slight that one generally cannot achieve any appropriate decoration, but only colored, relatively dull lacquer.

In view of the prior art, the problem which the present invention proposes to solve is to provide a method for producing a decoration that solves the above explained problems. In particular, a metallic specular effect, preferably a shiny gold, shiny lemon gold, shiny platinum and shiny palladium effect should be obtained, such as can be produced for example by precious metal gloss preparations, without the need for high baking temperatures. Moreover, the decoration should be produced as easily and economically as possible. The properties of the coatings by which a decoration is produced should not be adversely affected. Thus, the coating should have the highest possible adherence to different materials. Moreover, the decoration which can be obtained by the method should have good image sharpness.

These problems as well as others not explicitly mentioned, yet which are clearly deducible or evident from the situation mentioned at the outset, are solved by a decal with all the features of patent claim 1. Advisable modifications of the decal according to the invention are protected by dependent claims 2 to 13. In regard to the method, the subject matter of claim 14 provides a solution for the underlying problem.

The subject matter of the present invention is a decal for producing a decoration, comprising a non-leafing pigment layer and a first protective layer, characterized in that the decal is designed so that the non-leafing pigment layer can be applied closer to a substrate that the first protective layer.

Thanks to this embodiment a decoration can be obtained in easy manner, which produces a metallic specular effect, preferably a shiny gold, shiny lemon gold, shiny platinum and shiny palladium effect. In this way, a decoration can be easily and simply applied to various surfaces, without this requiring a high baking temperature. Moreover, the decoration can be produced in advance by the use of economical printing methods, even for small production lots, without any special restrictions in regard to the substrate.

In this way, surprisingly, a shiny gold, shiny lemon gold, shiny platinum and shiny palladium effect can be achieved in an especially simple and economical way, without having to use precious metals. The decoration therefore constitutes an economical shiny gold, shiny lemon gold, shiny platinum and shiny palladium imitation.

Preferably the non-leafing pigment layer is designed so that it produces a metallic specular effect, preferably a shiny gold, shiny lemon gold, shiny platinum and shiny palladium effect.

In one particular embodiment, the metallic specular effect is manifested by a high gloss. Preferably, the decoration produced by the decal can [have] a gloss of at least 200 GE, preferably at least 300 GE, especially preferably at least 400 GE, specially preferably 500 GE and most specially preferably 650 GE. The gloss is determined in this case by a measurement at 200 of the directed degree of reflection, preferably in accordance with DIN EN ISO 7668:2011-03, where GE stands for units of gloss. Preferably, a micro-TRI-gloss meter from the Byk Gardner Company can be used for this, and further information will be found in the device description.

The aforementioned high gloss depends, among other things, on the specific configuration of the pigments used, especially their shape and their composition. Gloss values of at least 200 GE, preferably at least 300 GE, especially preferably at least 400 GE, specially preferably 500 GE and most specially preferably 650 GE are preferably achieved with aluminum pigments, preferably flake-like aluminum pigments, which can be produced for example by PVD methods. With the aforementioned PVD pigments, gloss values of even most especially preferred at least 1000 GE can be achieved.

In the decals according to the invention with colored protective varnish and aluminum pigment to achieve a gold color, the achieved gloss values are often less than the aforementioned values, while the configuration according to the invention, i.e., the fact that the non-leafing pigment layer can be applied closer to a substrate than the first protective layer, results in higher gloss values than a configuration not having this feature. Preferably, the decoration obtained with the decal can have a gloss of at least 100 GE, preferably at least 150 GE, especially preferably at least 200 GE, especially preferred at least 400 GE and most especially preferred at least 600 GE, if aluminum pigments are used in combination with a colored first protective layer.

Brass and/or gold bronze pigments in decals according to the invention often result in values lower than the aforementioned ones, while the configuration according to the invention, i.e., the fact that the non-leafing pigment layer can be applied closer to a substrate than the first protective layer, results in higher gloss values than a configuration not having this feature. Preferably, the decoration obtained with the decal can have a gloss of at least 100 GE, preferably at least 150 GE, especially preferably at least 200 GE, especially preferred at least 400 GE and most especially preferred at least 600 GE, if brass and/or gold bronze pigments are used, for example.

The decal has a first protective layer, which may preferably be formed by a varnish, preferably a cross-linked varnish. The preferred varnishes from which the first protective layer can be produced include varnishes which can be hardened by irradiation with light, preferably ultraviolet light (UV varnishes) and 2-component varnishes (2K varnishes). UV varnishes may be radical-hardening or cation-hardening. Cation-hardening UV varnishes are preferable. These varnishes preferably have as their resin base a compound containing an oxiran group, generally a cycloaliphatic epoxy resin (see Edwin Tafelmeier, UV-radiation hardening technologies, Coates Screen, SN-Online). Cation-hardening UV varnishes generally comprise epoxy resins, modified resins (for flexibility or toughness), reactive diluents, photoinitiators (preferably blocked Lewis or Broensted acids), optionally pigments, additives (wetting, flow) and sometimes polyols (polyester polyols and/or polyether polyols). A discussion of preferred 2K varnishes will be found in Paolo Nanetti, The science of varnish raw materials, Vincentz 1977, chap. 1.4.1 Isocyanate resins 2 (polyurethanes, PUR materials), p. 78-85. Among the preferred 2K varnishes are, in particular, varnishes based on aliphatic and/or cycloaliphatic polyisocyanates and OH-functional polyacrylic acid esters and/or OH-functional polymethacrylic acid esters or OH-functional acrylic or methacrylic copolymers.

Moreover, it may be provided that the first protective layer has a thickness in the range of 0.3 µm to 6 µm, preferably 0.4 µm to 4.0 µm, especially preferably 0.5 µm to 3 µm (dry film thickness). The dry film thickness can be measured for example per DIN 50981: 1979-05 and DIN 50982:1987-08, preferably with a Hommel tester T 8000.

In one preferred embodiment, the first protective layer may have a roughness Rz less than 0.60 µm, preferably less than 0.55 µm, especially preferably less than 0.50 µm, especially preferably less than 0.45 µm, particularly preferably less than 0.40 µm. The roughness Rz describes the mean roughness (averaged depth of roughness, ten-point height) and can be measured per DIN 4768: 1990-05. The averaged roughness (Rz) pertains to a dimension and is determined as follows. A defined measurement length on the surface of the workpiece is divided into seven equal-size single measurement lengths. But the evaluation is done only for five of these lengths, since the Gaussian filter used requires one single-measurement half-length at the start and end, or one convolution has a not negligible inlet and outlet behavior. From the five single depths of roughness so determined, the average is formed.

Preferably, it may be provided that the first protective layer is configured such that, upon applying the composition with which the layer with a non-leafing pigment is applied, [it] is not significantly affected in its properties. Accordingly, there is preferably a clear layer transition in passing from the first protective layer to the non-leafing pigment layer. This occurs when a broad transitional layer is not present between the first protective layer and the non-leafing pigment layer. Broad transitional layers occur when applying the non-leafing pigment layer to the first protective layer if the latter is subjected to an attack, for example because the solvent used in the composition to apply the non-leafing pigment layer can attack the first protective layer and/or because the first protective layer is not sufficiently cross-linked. Broad transitional layers are often visible as cloudiness.

The first protective layer may be colorless or have a color. In one preferred embodiment, for example, a coloring agent may be used, preferably a dye or color pigment, producing a yellow coloration of the first protective layer. Especially preferably, the first protective layer may be transparent.

Besides a first protective layer, a decal according to the invention has at least one non-leafing pigment layer. Preferably, the non-leafing pigment layer lies in contact with the first protective layer, so that the two layers are neighboring each other. The non-leafing pigment layer comprises non-leafing pigments. Non-leafing pigments are known in the industry and are distinguished by a good compatibility with the components of a varnish, especially the binder, so that non-leafing pigments can be homogeneously distributed in a varnish layer. Preferably, the non-leafing pigments may be configured as metal-effect pigments and have a flake-like form.

The non-leafing pigments can be produced in the usual manner. Preferred non-leafing pigments with metal effect can be made for example through dry grinding, wet grinding, and Physical Vapor Deposition (PVD), wherein PVD-pigments may be used especially preferably.

Preferably, the non-leafing pigments may have a mean diameter ($D_{50}$) in the range of 2 to 24 µm, preferably 4 to 20 µm, especially preferably 6 to 15 m, measured by laser diffraction, preferably by ISO 13320:2009-10, where a CILAS laser granulometer (CILAS 1064) can be used in particular. Instructions for the measurement will be found for example in Partikelwelt No. 1, September 2002, page 2 to 4 (Particle analysis with CILAS laser diffraction). In the flake-like pigments used preferably, these values pertain to the diameter of the flakes, not the particle thickness. The $D_{50}$ value is the median of the distribution (50% of particles are larger, 50% of particles are smaller). Moreover, it may be provided that the non-leafing pigments have an especially narrow particle size distribution, which can be described by the difference between the $D_{10}$ value and the $D_{90}$ value ($D_{10}$ value: 10% of particles are smaller, 90% of particles are larger, $D_{90}$ value: 90% of particles are smaller, 10% of particles are larger). Preferably, it may be provided that the difference between the $D_{10}$ value and the $D_{90}$ value is at most 25 µm, preferably at most 15 µm, especially preferably at most 10 µm.

Moreover, it may be provided that the non-leafing pigments of the non-leafing pigment layer contain aluminum, brass and/or gold bronze pigments, preferably flake-like aluminum pigments.

Besides the non-leafing pigments, the non-leafing pigment layer generally contains at least one binder which is compatible with the non-leafing pigments. These binders are generally known. They include among others polyolefins, vinyl, acrylic or methacrylic polymers, copolymers based on acrylates, methacrylates and/or vinyl monomers, polyester, polyamide or phenolformaldehyde resins, polyethylene urea, polyether, preferably cellulose or cellulose derivates, especially preferably cellulose ether and/or cellulose ester.

Preferably, the weight ratio of non-leafing pigments to binder may be in the range of 100:1 to 1:2, preferably 30:1 to 1:1.5, especially preferably 15:1 to 1:1, most preferably 8:1 to 1:1.

Besides the non-leafing pigments, the non-leafing pigment layer may contain fractions of leafing pigments. Leafing pigments are incompatible with the binder of the non-leafing pigment layer, so that leafing pigments accumulate on the surface of the varnish upon drying. Preferably, the weight ratio of non-leafing pigments to leafing pigments in the non-leafing pigment layer may be less than 1:1, preferably less than 5:1, especially preferably less than 10:1, especially preferably less than 20:1 and most preferably less than 100:1. In another embodiment, it may be provided that the non-leafing pigment layer contains no leafing pigments.

Moreover, it may be provided that the non-leafing pigment layer has a thickness (dry film thickness) in the range of 0.3 µm to 5 µm, preferably 0.4 µm to 3.0 µm, especially preferably 0.5 µm to 2 µm, measured by means of DIN 50981: 1979-05 and DIN 50982:1987-08, preferably with a Hommel tester T 8000.

Surprising benefits can be achieved when the thickness of the first protective layer is at least 30% of the thickness of the non-leafing pigment layer, preferably at least 50% and especially preferably at least 100%.

In another embodiment, it may be provided that the non-leafing pigments contain aluminum pigments, preferably consist of aluminum pigments, and the first protective layer is colored, preferably using a yellow dye or a yellow pigment.

Preferably the decal may have a second protective layer, which is applied to the non-leafing pigment layer, so that the non-leafing pigment layer is arranged between the first and the second protective layer. This second protective layer may be composed of the same materials as the first protective layer, especially UV varnishes and/or 2K varnishes. Moreover, the second protective layer may be formed by a conventional colored layer, wherein compositions for production of colored layers are available, among others, from Ferro GmbH under the brand Xpression.

Moreover, it may be provided that the second protective layer has a thickness in the range of 0.3 µm to 6 µm, preferably 0.4 µm to 4.0 µm, especially preferably 0.5 µm to 3 µm (dry film thickness).

The second protective layer may be colorless or colored. Furthermore, the decal may contain a colored layer which is arranged between the first protective layer or the non-leafing pigment layer and the second protective layer. Suitable compositions for the production of colored layers are commercially available, among others, from Ferro GmbH under the brand Xpression. If the colored layer is arranged between the first protective layer and the non-leafing pigment layer, it may preferably be provided that this colored layer has the properties described above and in the following for the first protective layer, especially in regard to roughness and/or swelling capacity.

Moreover, it may be provided that the decal is applied to a substrate, preferably a dextrin substrate, especially preferably a paper with dextrin coating. Alternatively, paper with a polyvinyl alcohol coating may also be used.

Moreover, it may be provided that the decal is applied to a substrate and has a strippable layer, which is arranged between the non-leafing pigment layer and a substrate. Materials from which a strippable layer can be produced are widely known in the industry and are commercially available, among others, from Ferro GmbH in the Xpression series under the brand Strippable Coat, Numbers 80 2039 or 80 2070.

For example, it may be provided that the strippable layer has a thickness (dry film thickness) in the range of 24 µm to 54 µm, preferably 26 µm to 40 µm, especially preferably 28 m to 30 µm, as measured by DIN 50981: 1979-05 and DIN 50982:1987-08, preferably with a Hommel tester T 8000.

Preferably, the decal may contain a bonding layer, which is applied to the non-leafing pigment layer, a second protective layer or a further layer, so that the non-leafing pigment layer is arranged between the first protective layer and the bonding layer. The bonding layer is chosen according to the purpose of the application, so that a good adherence to the substrate is achieved. Thus, for adherence to plastics one may apply a base coat, such as 80 4520 from Ferro GmbH, as the last layer of the decal. To improve the adherence on glassy surfaces (glass, ceramics, enamel), the use of a primer is alternatively possible. Prior to the application of the decal, the surface being decorated is treated with a primer. Silanes, among others, may be used as the primer. For example, the primers 80 415 or 80416 from Ferro GmbH may be used.

The decal may contain further layers, but in general these are not necessary. Thus, for example, an adhesive layer may be omitted, so that a preferred decal has no adhesive layer. An adhesive layer here means a layer producing an independent adhesion to a substrate in the dry state, without a hardening step needing to be performed, so that an adhesive layer generally contains an adhesive, such as a pressure sensitive adhesive.

Another subject matter of the present invention is a method for producing the decals according to the invention. Preferably for this a layer with a non-leafing pigment can be applied on a first protective layer and dried.

Moreover, it may be provided that the composition with which the layer with a non-leafing pigment is applied contains no solvent in which the first protective layer is dissolved or swelled. Preferably, the solvent in the composition with which the layer with a non-leafing pigment is applied results in a swelling of the first protective layer of at most 8%, preferably at most 6%, especially preferably at most 4% and most preferably at most 2%, measured at 25° C. after a time of action of around 10 hours. Swelling pertains here to the volume increase of a corresponding layer whose thickness may amount to around 100 µm.

In another preferred embodiment, it may be provided that the first protective layer is cross-linked. A cross-linking can be accomplished in particular by the above-described methods. The composition with which the layer with a non-leafing pigment is applied is preferably applied to the first protective layer only at a time when an adequate cross-linking is present. This time may easily be determined by the person skilled in the art and is dependent on many factors. Thus, the use of hardening catalysts may significantly decrease the hardening time. Moreover, the hardening time depends on the chosen components. When using one or more hardening catalysts, a hardening time of 1 h for example, preferably 4 h, especially preferably 7 h and most preferably 24 h may be enough to prevent a swelling when applying the non-leafing pigment-containing composition. Without the use of hardening catalysts, a longer hardening time should be observed. For example, acceptable results may be obtained after 12 hours, preferably 24 hours, especially preferably 36 hours, and most preferably after 48 hours.

Preferably, it may accordingly be provided that the first protective layer is designed so that its properties are not significantly impaired upon applying the composition with which the layer with a non-leafing pigment is applied. To avoid an impairment, the above discussed measures can be carried out, especially an adequate hardening or the use of appropriate solvents. In this way, excellent gloss values can be achieved in particular.

Preferably, it may be provided that the first protective layer is applied such that the surface has a roughness Rz less than 0.60 µm, preferably less than 0.55 µm, especially preferably less than 0.50 µm, most preferably less than 0.45 µm, especially preferably less than 0.40 µm. The roughness Rz of the first protective layer may be influenced in particular by additives such as flow agents or defoamers. The printing during silkscreen printing may also have influence on the roughness, due to bubble formation. In order to keep the transmission losses as low as possible, during a silkscreen printing process the first protective layer is applied preferably by a screen mesh in the range of 90 to 180 T, especially preferably 100 to 140 T and most preferably 120 T.

Preferably, the first protective layer may be applied with a wet film thickness in the range of 8 µm to 70 µm, preferably 9 µm to 50 µm, especially preferably 10 µm to 30 µm. The wet film thickness can be determined per ISO 2808:2007-05.

Preferably, the composition with which the first protective layer is applied has a viscosity in the range of 400 to 4500 mPas, especially preferably in the range of 410 to 2000 mPas, most preferably in the range of 450 to 1100 mPas, measured at 23° C., with a shear rate of 200 s$^{-1}$, measured by a plate and cone.

Moreover, it may be provided that the composition with which the first protective layer is applied has a solvent content in the range of 10% to 40%, especially preferably in the range of 15% to 35%, most preferably in the range of 17% to 30%. Suitable solvents include, among others, aromatic hydrocarbons, hydroaromatic hydrocarbons, esters and glycol ether.

Preferably the composition with which the layer with a non-leafing pigment is applied has a viscosity in the range of 80 to 8000 mPas, especially preferably in the range of 120 to 4000 mPas, most preferably in the range of 170 to 2500 mPas, measured at 23° C., with a shear rate of 200 s$^{-1}$, measured by a plate and cone. The pastes exhibit a structural viscosity, that is, they show a viscosity between 2 Pas and 30 Pas at a shear rate of 1.1 s$^{-1}$, measured with a plate and cone at 23° C.

Moreover, it may be provided that the non-leafing pigment layer is applied with a wet film thickness in the range of 6 μm to 40 μm, preferably 9 μm to 30 μm, especially preferably 10 μm to 25 μm.

Moreover, it may be provided that the composition with which the layer with a non-leafing pigment is applied has a solvent content in the range of 70% to 95%, preferably in the range of 80 to 92% and most preferably in the range of 85% to 90%. The suitable solvents include, among others, especially esters, glycol ether, ethers and alcohols.

In another embodiment of the present method, at first a strippable layer may be applied to a substrate, on which a first protective layer is applied. The substrate may be a paper with dextrin coating. Moreover, it may be provided that a first protective layer is applied to a substrate, preferably a paper with dextrin coating or a coating with polyvinyl alcohol.

Another subject matter is a decal which can be obtained with a method according to the invention.

Another subject matter is the use of a decal according to the invention to produce a decoration, wherein the decal can be applied in particular to glass, ceramic, metal, wood or plastic. Preferably, the decal may be applied to the substrate with the last printed layer.

Preferably, after applying the decal on a substrate, hardening is done, wherein the hardening preferably occurs at a temperature in the range of 50° C. to 230° C., especially preferably 60 to 220° C. It is recommended to first strip off the strippable layer in event of a tempering above 60° C.

Moreover, it may be provided that a primer is applied to the substrate, onto which the decal is later applied, the primer improving the adherence of the decal.

The invention is explained more closely below with the aid of examples, without this producing a limitation of the invention.

EXAMPLE 1: PRODUCTION OF THE PROTECTIVE VARNISH (2-COMPONENT POLYURETHANE VARNISH)

A first and a second solution with the following components are prepared and mixed.
Solution 1:
Acrylate copolymer 53.64 g
Solvent naphta 18.39 g
Ester (such as butyl glycol acetate) 4.6 g
Surface additive based on polyacrylate (such as Byk 350) 0.77 g
Surface additive based on polyacrylate copolymers (such as Byk 394) 0.38 g
Polyether-modified siloxane (fluorine-free) to improve the substrate wetting 0.77 g
The components are mixed
Solution 2:
HDI-Biuret 21.46 g

EXAMPLE 2: PRODUCTION OF THE METAL PASTE FOR SILVER-COLORED MIRRORS

The following components are brought together, first of all dissolving the resin in the solvents and then the pigment suspension and the additive, while stirring.
Resin (cellulose acetate butyrate) 4.5 g
Ester (such as butyl acetate) 7.01 g
Alkyl glycol 2.76 g
Vacuum metallized aluminum pigment suspension 84.07 g
Cross-linking and dispersing additive (such as Disperbyk 103) 4.76 g

EXAMPLE 3: PRODUCTION OF THE COLORED PROTECTIVE VARNISH (2-COMPONENT POLYURETHANE VARNISH)

Two solutions (solution 3 and solution 4) are prepared and mixed shortly before application (e.g., silkscreen printing).
Solution 3: solution 1 from example 1 is reacted with 1% Sudan yellow 373.
Solution 4: identical to solution 2 of example 1

EXAMPLE 4: DECAL PRODUCTION FOR SILVER-COLORED MIRROR WITH 2K PROTECTIVE VARNISH

A decal is produced by the following steps:
1. On decal paper Trucal, a strippable layer is printed with size 24 screen and dried at RT.
2. On this, the protective varnish from example 1 is printed with size 120 screen and dried at RT.
3. On this, the metal paste from example 2 is printed with size 120 screen and dried at RT.
4. On this, the protective varnish from example 1 is printed with size 120 screen and dried at RT.
5. Depending on the substrate, it may be necessary to use a primer to improve the adhesion, in the case of glass the 80 4515 or 80 4516 from Ferro.
6. The decal is reverse applied and dried. One obtains a mirror similar to a mirror obtained with a shiny lemon gold preparation after baking.
7. In order to improve the adhesion, the decorated substrate may be tempered for 15 min at 60° C. The strippable layer is then stripped off.

EXAMPLE 5: DECAL PRODUCTION FOR GOLD-COLORED MIRROR WITH 2K PROTECTIVE VARNISH

A decal is produced by the following steps:
1. On decal paper Trucal, a strippable layer is printed with size 24 screen and dried at RT.
2. On this, the protective varnish from example 3 is printed with size 120 screen and dried at RT.

3. On this, the metal paste from example 2 is printed with size 120 screen and dried at RT.
4. On this, the protective varnish from example 1 is printed with size 120 screen and dried at RT.
5. Depending on the substrate, it may be necessary to use a primer to improve the adhesion, in the case of glass the 80 4515 or 80 4516 from Ferro.
6. The decal is reverse applied and dried. One obtains a mirror similar to a mirror obtained with a shiny gold or shiny lemon gold preparation after baking.
7. In order to improve the adhesion, the decorated substrate may be tempered for 15 min at 60° C. The strippable layer is then stripped off.

EXAMPLE 6: DECAL PRODUCTION WITH UV PROTECTIVE VARNISH

A decal is produced by the following steps:
1. On decal paper Trucal, a strippable layer is printed with size 24 screen and dried at RT.
2. On this, the colorless variant of UV protective varnish L419 from Ferro is printed with size 120 screen and hardened under UV irradiation.
3. On this, the metal paste from example 2 is printed with size 120 screen and dried at RT.
4. On this, the Xpression series from Ferro of the 2K protective varnish is printed with size 120 screen and dried at RT.
5. Depending on the substrate, it may be necessary to use a primer to improve the adhesion, in the case of glass the 80 4516 from Ferro.
6. The decal is reverse applied and dried. One obtains a mirror similar to a mirror obtained with a shiny platinum or shiny palladium preparation after baking.
7. In order to improve the adhesion, the decorated substrate may be tempered for 15 min between 60° C. and 160° C.
8. If tempering is done for 15 min at 200° C., the protective layer becomes yellow colored and one obtains a mirror similar to a mirror obtained with a shiny gold or shiny lemon gold preparation after baking.

EXAMPLE 7: PRODUCTION OF THE COLORED PROTECTIVE VARNISH

| Solution 5 Mixing by means of dissolver | |
|---|---|
| Acrylate copolymer | 47.16 |
| Solvent naphta | 16.14 |
| Ester (such as butyl glycol acetate) | 13.84 |
| Yellow colored pigment (such as Predisol Yellow 150) | 1.82 |
| Red colored pigment (such as Predisol Red 179) | 0.61 |
| Surface additive based on polyacrylate (such as Byk 350) | 0.16 |
| Surface additive based on polyacrylate copolymers (such as Byk 394) | 0.33 |
| Polyether-modified siloxane (fluorine-free) to improve the substrate wetting | 0.33 |
| Solution 2 | |
| HDI Biuret | 19.60 |

Solution 5 and solution 2 are mixed before the printing.

EXAMPLE 8: PREPARATION OF THE METAL PASTE SIMILAR TO EXAMPLE 2 (RESINS PREDISSOLVED IN THE SOLVENT)

| | |
|---|---|
| Resin (cellulose acetate butyrate) | 3.84 g |
| Resin (methyl methacrylate) | 1.24 g |
| Dowanol PM | 25.34 g |
| Ester (such as butyl diglycol acetate) | 10.28 g |
| Vacuum metallized aluminum pigment suspension | 59.31 g |

EXAMPLE 9: DECAL PRODUCTION FOR GOLD-COLORED MIRROR WITH 2K VARNISH

1. Strippable varnish 80 2070 (Ferro commercial product) is printed with a number 24 screen on decal paper (Trucal Plus 170)
2. Printing of the protective varnish from example 10 with a number 100 screen, let dry 2 days
3. Printing of the metal paste from example 12 with a number 120 screen
4. Printing of the protective varnish from example 10 with a number 100 screen
5. Primer 804515 is applied to glass
6. The decal is reverse applied and dried. One obtains a mirror similar to a mirror obtained with a glossy gold preparation after baking.
7. The decal is tempered for 15 min at 60° C. The strippable varnish is then stripped off.

EXAMPLE 10: OPTIMIZED PROTECTIVE VARNISH, PREPARATION SIMILAR TO EXAMPLE 1

| Solution 6 | |
|---|---|
| Acrylate copolymer | 54.15 g |
| Solvent naphta | 18.56 g |
| Ester (such as butyl glycol acetate) | 4.64 g |
| Silicone-free defoamer | 0.3 g |
| Solution 2 | |
| HDI Biuret | 22.35 g |

Solution 6 and solution 2 are mixed before the printing.

EXAMPLE 11: PROTECTIVE VARNISH SIMILAR TO EXAMPLE 8 BUT WITH CATALYST

| Solution 9 | |
|---|---|
| Acrylate copolymer | 53.89 g |
| Solvent naphta | 18.48 g |
| Ester (such as butyl glycol acetate) | 4.62 g |
| Silicone-free defoamer | 0.3 g |
| Zink-containing catalyst | 0.5 |
| Solution 2 | |
| HDI Biuret | 22.22 g |

Solution 9 and solution 2 are mixed before the printing.

EXAMPLE 12: PREPARATION OF THE METAL PASTE SIMILAR TO EXAMPLE 2

| | |
|---|---|
| Resin (cellulose acetate butyrate) | 1.42 g |
| Ester (such as butyl glycol acetate) | 7.07 g |
| Ester (such as butyl diglycol acetate) | 2.79 g |
| Vacuum metallized aluminum pigment suspension | 84.88 g |

EXAMPLE 13: DECAL PRODUCTION FOR SILVER-COLORED MIRROR WITH 2K VARNISH

1. Strippable varnish 80 2070 (Ferro commercial product) is printed with a number 24 screen on decal paper (Trucal Plus 170)
2. Printing of the protective varnish from example 11 with a number 100 screen, let dry 1 day
3. Printing of the metal paste from example 12 with a number 120 screen
4. Printing of the protective varnish from example 11 with a number 100 screen
5. Primer 804515 is applied to glass
6. The decal is reverse applied and dried. One obtains a mirror similar to a mirror obtained with a glossy platinum preparation after baking.
7. The decal is tempered for 15 min at 60° C. The strippable varnish is then stripped off.

Gloss measurement: 1124 GE

EXAMPLE 14: DECAL PRODUCTION FOR SILVER-COLORED MIRROR WITH 2K VARNISH

8. Strippable varnish 80 2070 (Ferro commercial product) is printed with a number 24 screen on decal paper (Trucal Plus 170)
9. Printing of the protective varnish from example 10 with a number 100 screen, let dry 4 days
10. Printing of the metal paste from example 12 with a number 120 screen
11. Printing of the protective varnish from example 10 with a number 100 screen
12. Primer 804515 is applied to glass
13. The decal is reverse applied and dried. One obtains a mirror similar to a mirror obtained with a glossy platinum preparation after baking.
14. The decal is tempered for 15 min at 60° C. The strippable varnish is then stripped off.

Gloss measurement: 997 GE

EXAMPLE 15: DECAL PRODUCTION FOR SILVER-COLORED MIRROR WITH 2K VARNISH

1. Strippable varnish 80 2070 (Ferro commercial product) is printed with a number 24 screen on decal paper (Trucal Plus 170)
2. Printing of the protective varnish from example 10 with a number 100 screen, let dry 1 day
3. Printing of the metal paste from example 12 with a number 120 screen
4. Printing of the protective varnish from example 10 with a number 100 screen
5. Primer 804515 is applied to glass
6. The decal is reverse applied and dried. One obtains a mirror similar to a mirror obtained with a glossy platinum preparation after baking.
7. The decal is tempered for 15 min at 60° C. The strippable varnish is then stripped off.

Gloss measurement: 367

EXAMPLE 16: OPTIMIZED PROTECTIVE VARNISH, PRODUCTION SIMILAR TO EXAMPLE 1

| | |
|---|---|
| Solution 10 | |
| Acrylate copolymer | 54.08 g |
| Solvent naphta | 18.54 g |
| Ester (such as butyl glycol acetate) | 4.64 g |
| Silicone-containing defoamer | 0.4 g |
| Solution 2 | |
| HDI Biuret | 22.25 g |

Solution 10 and solution 2 are mixed before the printing.

EXAMPLE 17

| | |
|---|---|
| 80 4552 (Xpression 2K protective varnish, Ferro commercial product) | 100 g |
| 80 4553 (Xpression hardener, Ferro commercial product) | 30 g |

The two preparations are mixed immediately before printing.

EXAMPLE 18

Decal Production for Silver-Colored Mirror with 2K Varnish and 2K Xpression Protective Varnish 1. Strippable varnish 80 2070 (Ferro commercial product) is printed with a number 24 screen on decal paper (Trucal Plus 170)
2. Printing of the protective varnish from example 17 with a number 120 screen
3. Printing of the protective varnish from example 16 with a number 100 screen
4. Printing of the metal paste from example 12 with a number 120 screen
5. Printing of the protective varnish from example 16 with a number 100 screen
6. Primer 80 4515 is applied to glass
7. The decal is reverse applied, i.e., with the strippable layer as the top coat. Drying is then done. One obtains a mirror similar to a mirror obtained with a glossy platinum preparation after baking.
8. The decal is tempered for 15 min at 60° C. The strippable varnish is then stripped off.

Gloss measurement: 635 GE

Comparison Example

1. Strippable varnish 80 2070 (Ferro commercial product) is printed with a number 24 screen on decal paper (Trucal Plus 170)
2. Printing of the protective varnish from example 17 with a number 120 screen
3. Printing of the protective varnish from example 16 with a number 100 screen 4. Printing of the metal paste from example 12 with a number 120 screen
5. Printing of the protective varnish from example 16 with a number 100 screen
6. Primer 804515 is applied to glass
7. The decal is applied with the strippable layer as the bottom coat and dried. One obtains a silver-colored, dull decoration.
8, The decal is tempered for 15 min at 60° C.
Gloss measurement: 78 GE The examples show that excellent decals can be obtained with the present invention, resulting in a high metallic mirror effect, if the decals are designed according to the present invention, that is, being characterized in that the non-leafing pigment layer can be deposited closer to a substrate than the first protective layer. In this way, as is shown, the gloss effect can be boosted from 78 GE to 635 GE.

The invention claimed is:

1. A decal for adhering to a substrate, the decal comprising from top to bottom:
   a paper including a coating of dextrin,
   a strippable layer,
   a first protective layer including a cross-linked epoxy or a cross-linked polyurethane,
   a non-leafing pigment layer including non-leafing pigments in a polymeric binder, and
   a second protective layer including a cross-linked polyurethane,
   wherein the paper is arranged over the strippable layer,
   wherein the coating of dextrin is arranged between the strippable layer and the paper,
   wherein the strippable layer is arranged over the first protective layer,
   wherein the non-leafing pigment layer is arranged between the first and second protective layers such that the first and second protective layers protect the non-leafing pigment layer from degradation,
   wherein the decal is designed so that when applied to the substrate, the non-leafing pigment layer is arranged closer to the substrate than the first protective layer;
   wherein the first protective layer includes a surface, and the surface has a roughness (Rz) of less than 0.4 μm;
   wherein the non-leafing pigment layer produces a mirror effect for the decal;
   wherein the strippable layer is removable from the first protective layer,
   wherein a thickness of the strippable layer is greater than a thickness of the first protective layer, and
   wherein a thickness of the first protective layer ranges 0.3-6 μm and a thickness of the strippable layer ranges 24-54 μm.

2. The decal of claim 1, wherein:
   the decal further includes a bonding layer for adhering the decal to the substrate;
   the second protective layer is arranged between the non-leafing pigment layer and the bonding layer; and
   the decal is designed so that the bonding layer contacts and adheres to the substrate.

3. The decal of claim 1, wherein the non-leafing pigment layer allows the decal to produce a gloss of at least 300 gloss units measured at 20°.

4. The decal of claim 1, wherein the first protective layer is at least 30% of the thickness of the non-leafing pigment layer.

5. The decal of claim 1, further comprising a colored layer, which is applied to the non-leafing pigment layer, so that the colored layer is arranged between the non-leafing pigment layer and the first protective layer.

6. The decal of claim 1, wherein the non-leafing pigments comprise at least one selected from the group consisting of aluminum pigments, brass pigments and gold bronze pigments.

7. The decal of claim 1, wherein the first protective layer is colorless and transparent.

8. The decal of claim 1, wherein the first protective layer is colored by a colorant or a pigment.

9. The decal of claim 2, wherein:
   the second protective layer is in direct contact with the non-leafing pigment layer; and
   the bonding layer is in direct contact with the second protective layer.

10. A method for producing the decal of claim 1, comprising (a) applying a non-leafing pigment layer to a first protective layer, and (b) drying the layers.

11. The method of claim 10, wherein the non-leafing pigment layer contains no solvent in which the first protective layer dissolves or swells.

12. The method of claim 10, further comprising, prior to (a), step (z), applying a strippable layer to the first protective layer.

13. The method of claim 11, further comprising, prior to (a), step (z), applying a strippable layer to the first protective layer.

14. The method of claim 12, further comprising, prior to (z), step (y), applying the first protective layer to a substrate comprising dextrin.

15. The method of claim 13, further comprising, prior to (z), step (y), applying the first protective layer to a substrate comprising dextrin.

16. A method of adhering the decal of claim 1 to a substrate.

17. The method of claim 16, further including applying a primer to the substrate before applying the decal to the substrate in order to improve adhesion of the decal to the substrate.

* * * * *